US011931316B2

(12) United States Patent
Zhang

(10) Patent No.: US 11,931,316 B2
(45) Date of Patent: Mar. 19, 2024

(54) DETACHABLE PACIFIER

(71) Applicant: Aihua Zhang, Guangzhou (CN)

(72) Inventor: Aihua Zhang, Guangzhou (CN)

( * ) Notice: Subject to any disclaimer, the term of this patent is extended or adjusted under 35 U.S.C. 154(b) by 0 days.

(21) Appl. No.: 17/815,645

(22) Filed: Jul. 28, 2022

(65) Prior Publication Data

US 2023/0201080 A1 Jun. 29, 2023

(30) Foreign Application Priority Data

Dec. 29, 2021 (CN) ......................... 202123354666.1

(51) Int. Cl.
*A61J 17/00* (2006.01)

(52) U.S. Cl.
CPC .................................. *A61J 17/105* (2020.05)

(58) Field of Classification Search
CPC ........ A61J 17/00; A61J 17/105; A61J 17/001; A61J 17/113; A61J 11/00; A61J 17/111; A61J 17/10
See application file for complete search history.

(56) References Cited

U.S. PATENT DOCUMENTS

2011/0046671 A1* 2/2011 Okoturo .................. A61J 17/10 606/236
2020/0214941 A1* 7/2020 Holman ................ A61J 17/109

FOREIGN PATENT DOCUMENTS

CN 110680754 A * 1/2020 .......... A61B 17/244
DE 202017006939 U1 * 1/2019

OTHER PUBLICATIONS

English translation of the description to CN 110680754 (Year: 2020).*
English translation of the description to DE 202017006939 (Year: 2020).*

* cited by examiner

*Primary Examiner* — Erich G Herbermann
*Assistant Examiner* — Aman Kumar Mann
(74) *Attorney, Agent, or Firm* — Maschoff Brennan

(57) ABSTRACT

The present invention relates to a detachable pacifier, comprising a limiting device and a pressing device which can be disassembled and assembled with each other, wherein a nipple is arranged below the limiting device and a dustproof cover is arranged outside the pacifier. The limiting device comprises a limiting plate and an annular support portion, an upper edge of the annular support portion is provided with annular clamping portions at intervals; the pressing device comprises a lower end cover, an upper end cover and a pull ring which can be disassembled and assembled with each other. The parts of the detachable pacifier can be disassembled, mounted and cleaned at any time. Further, the clamping blocks at the notch of the annular support portion and a limiting block which is matching the clamping block is provided in the lower end cover, to prevent the detachable pacifier from being disassembled by infants.

10 Claims, 5 Drawing Sheets

DETACHABLE PACIFIER

FIELD OF TECHNOLOGY

The present invention relates to the technical field of baby products, and in particular to a detachable pacifier.

BACKGROUND

Sucking is the instinctive behavior of newborns and infants, and sucking reflex is also one of the innate reflexes of the newborns. The strength and weakness of the sucking reflex can play a certain role in determining health conditions of children and early warning of diseases. Therefore, pacifiers are frequently used in clinical neonatology. The functions thereof mainly lie in that: firstly, they can satisfy the non-nutritional sucking of newborns and pacificate the emotions of the newborns; secondly, it helps to give a high workout to the jaw, palate and lips of the newborns by means of sucking; thirdly, the use of pacifiers can help newborns develop the habit of keeping their mouths shut and adapt to the nasal breathing pattern. According to the research, the use of pacifiers can effectively reduce the sudden death rate of the newborns who have not yet developed the nasal breathing habit and fourthly, pacifiers can reduce crying and prevent hoarseness, abdominal flatulence and umbilical hernia caused by excessive crying; at the same time, it can also reduce the workload of clinical nurses. Existing domestic pacifiers in the market cannot fully adapt to medical needs, and shortcomings thereof are mainly embodied in that: the domestic pacifiers are difficult to disassemble completely, and inconvenient to fully disinfect without taking a cross-use condition into consideration; a pacifier head is generally designed as a single cylindrical structure, which is inconvenient to change according to clinical needs.

SUMMARY

The technical problem to be solved by the present invention is to provide a detachable pacifier with stable structure and convenient disassembly aiming at problems existing in the prior art.

The technical solutions used in the present invention to resolve the foregoing technical problem are as follows:

A detachable pacifier, characterized by comprising a limiting device and a pressing device capable of being disassembled and assembled with each other, wherein a nipple is arranged below the limiting device, the limiting device comprises a limiting plate and an annular support portion extending upwards along the limiting plate, an external side of the annular support portion is provided with annular clamping portions at intervals and in a circumferential direction, an upper end of the annular support portion is provided with a notch, and the annular support portion is provided with a clamping block at the bottom of the notch;

The pressing device comprises a lower end cover, an upper end cover and a pull ring capable of being disassembled and assembled with each other, wherein a first cavity structure is arranged below the lower end cover, and annular buckles matching the annular clamping portions are arranged at an inner side of the first cavity structure at intervals; the annular buckles are buckled under the annular clamping portions by means of pressing and rotating; the inner side of the first cavity structure is provided with a limiting block, and the limiting block extends to one side of the clamping block in the notch by means of pressing the lower end cover; the limiting block is buckled on the other side of the clamping blockby means of the rotation of the lower end cover; the clamping block is used for applying a resistance facing an opposite direction to the limiting block when the lower end cover-rotates;

An upper end of the lower end cover is provided with a groove in a penetrating manner in a transverse direction, an upper portion of the lower end cover is integrally provided with an annular connecting wall, wherein the annular connecting wall is provided with an opening in communication with the groove; the upper end cover is sheathed outside the annular connecting wall, a clamping portion is arranged in the upper end cover, and the annular connecting wall is provided with a clamping hole matching the clamping portion; a lower end of the upper end cover is provided with a connecting hole, wherein the connecting hole matches the groove; the pull ring comprises a lifting portion and a connecting portion, wherein the connecting portion is arranged between the groove and the connecting hole.

There are three annular clamping portions and the three annular clamping portions are distributed in a middle-upper portion of the annular support portion.

The connecting portion is provided with a limiting ring, and the groove is provided with a recess matching the limiting ring.

A cross section of the connecting portion is circular; the groove and the connecting hole are in clearance fit with the connecting portion.

The pull ring is D-shaped.

The pull ring is rotatably connected to the lower end cover and the upper end cover.

A middle portion of the limiting plate is provided with a nipple mounting hole, and a middle portion of the cover is provided with a mounting base matching the nipple mounting hole.

The limiting plate is provided with air holes on both sides of the annular support portion.

A dustproof cover is connected below the limiting plate, and the dustproof cover comprises a plate body and a cover body arranged below the plate body, wherein an interface matching the air holes, is arranged above the plate body.

A cross section of a lower end of the limiting block is arc-shaped.

compared with the prior art, according to the present invention, the beneficial effects brought by the detachable pacifier are: by means of arranging buckles and the clamping portions at a structural matching portion, the assembly of corresponding structures can be completed by aligning and sequentially placing and then pressing and rotating the buckles; when cleaning the pacifier, rotate a lower end cover relative to an annular support portion, such that the annular buckles are separated from the clamping portions, and the whole structure can be disassembled into a single component; then use a nipple brush to clean from the inside to the outside of the nipple; such a structure can be disassembled, mounted and cleaned at any time, which is convenient and quick; by arranging clamping blocks at the notch of the annular support portion and arranging a limiting block matching the clamping block in the lower end cover, so that the disassembly of the lower end cover, the clamping block brings resistance in the opposite direction to the lower end cover, and the lower end cover needs to be unscrewed by using great strength, such that the pacifier can be prevented from being disassembled by infants, and the structure is stable.

DETAILED DESCRIPTION OF THE EMBODIMENTS

The present invention is further described in detail below with reference to the accompanying drawings and embodiments.

Figure 1:
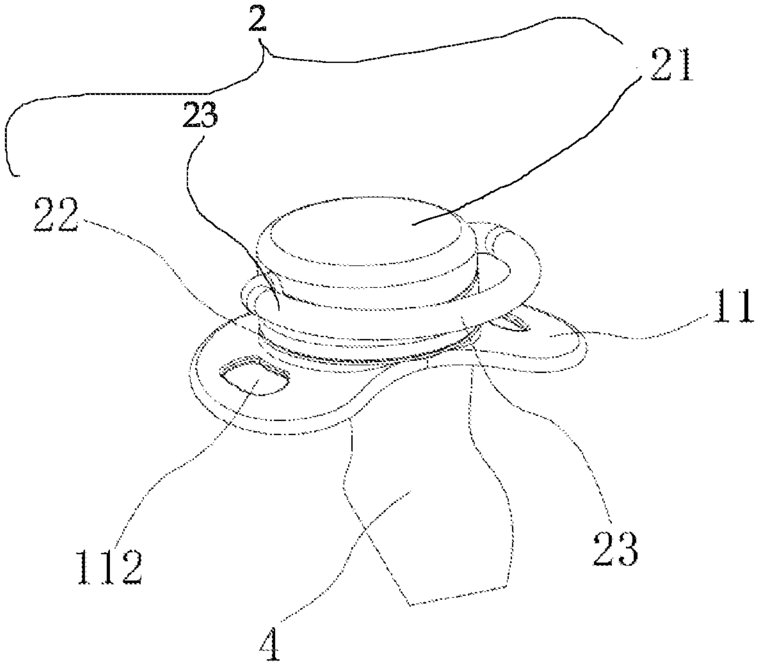
FIG. 1 is a first stereoscopic schematic diagram of a detachable pacifier of the present invention.
Figure 2:
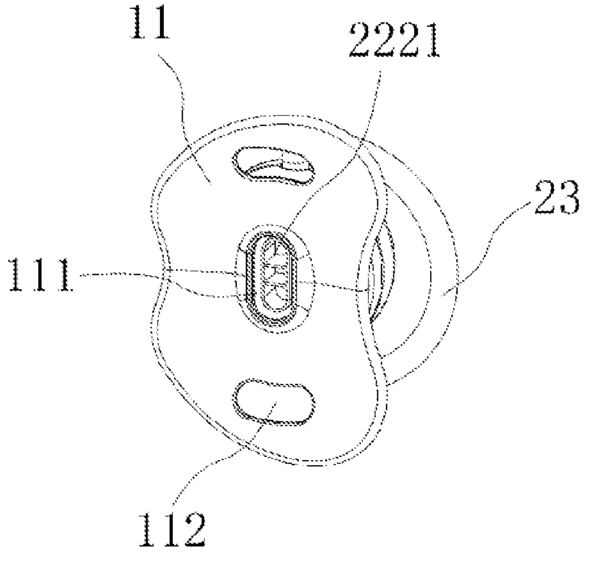
FIG. 2 is a second stereoscopic schematic diagram of a detachable pacifier of the present invention.
Figure 3:
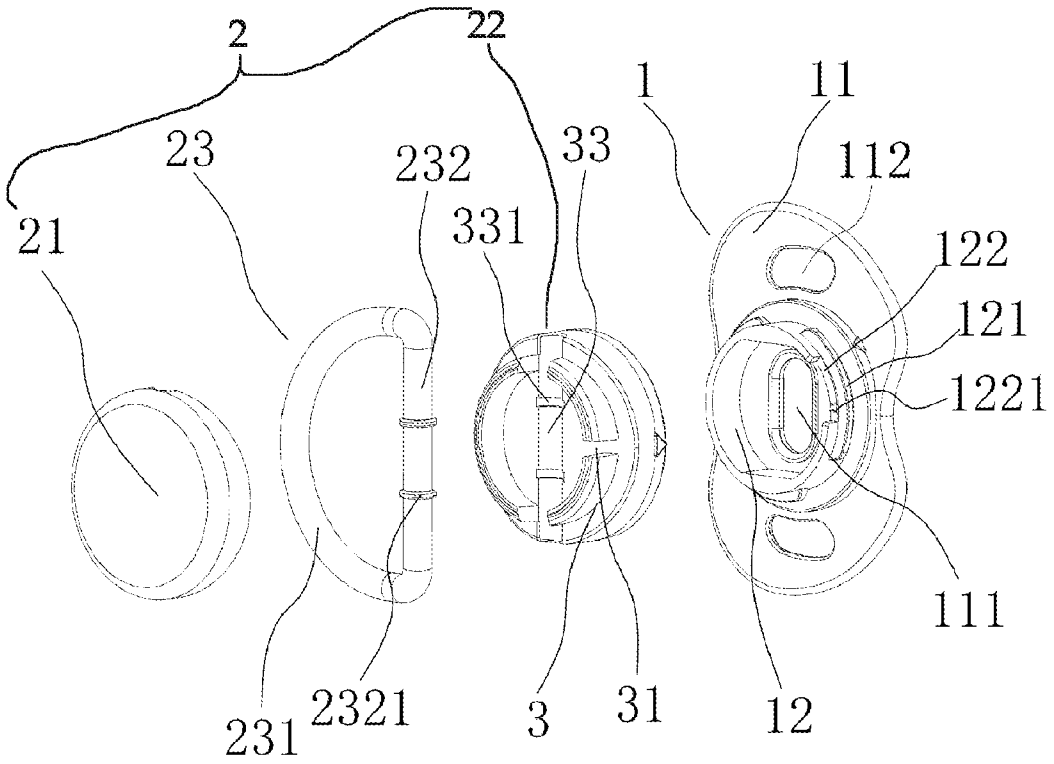
FIG. 3 is a first exploded schematic diagram of a detachable pacifier of the present invention.
Figure 4:
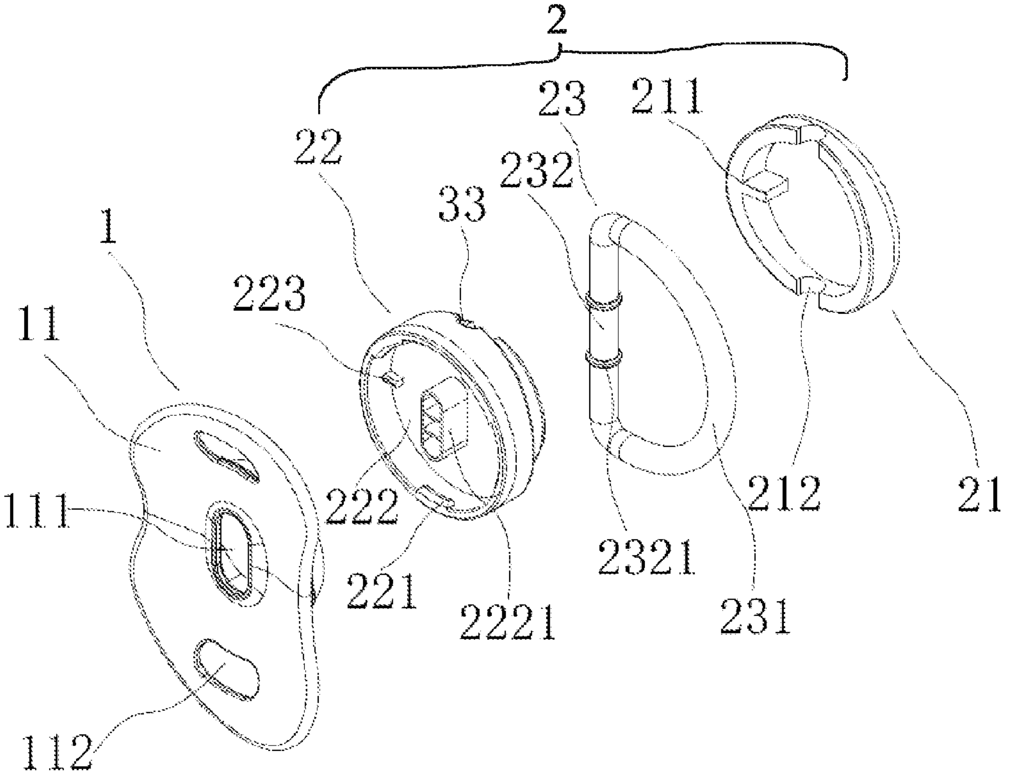
FIG. 4 is a second exploded schematic diagram of a detachable pacifier of the present invention.
Figure 5:
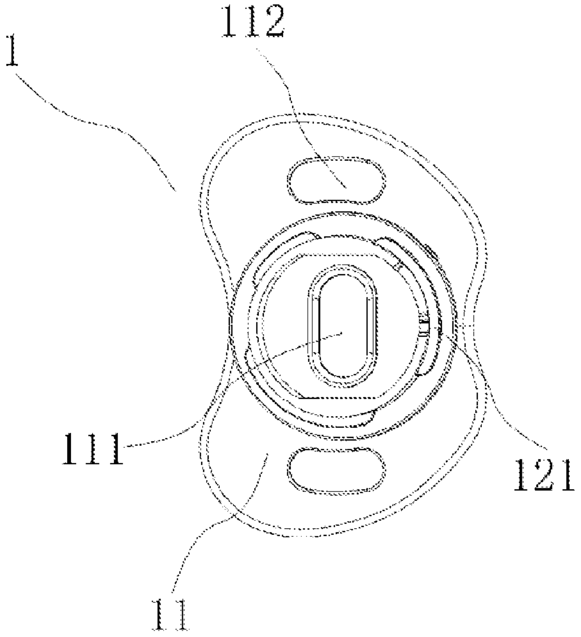
FIG. 5 is a structural schematic diagram of a limiting device of a detachable pacifier of the present invention.
Figure 6:
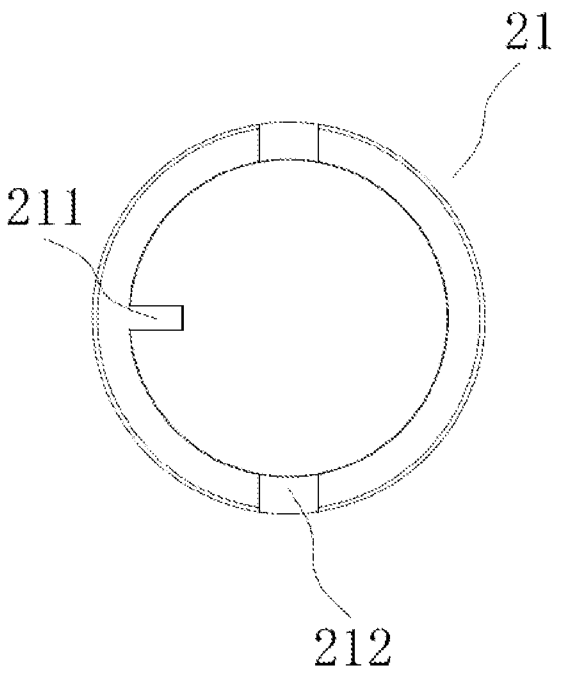
FIG. 6 is a structural diagram of an upper end cover of a detachable pacifier of the present invention.
Figure 7:
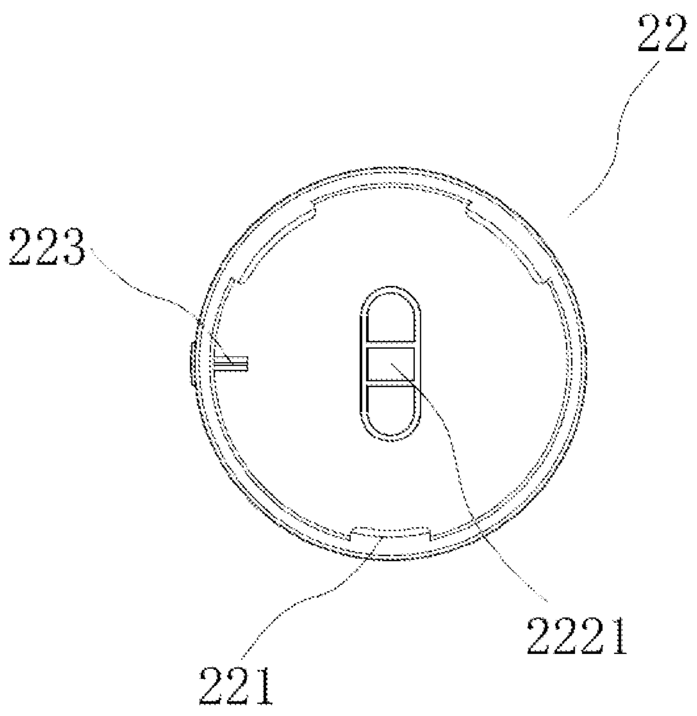
FIG. 7 is a first structural diagram of a lower end cover of a detachable pacifier of the present invention.
Figure 8:
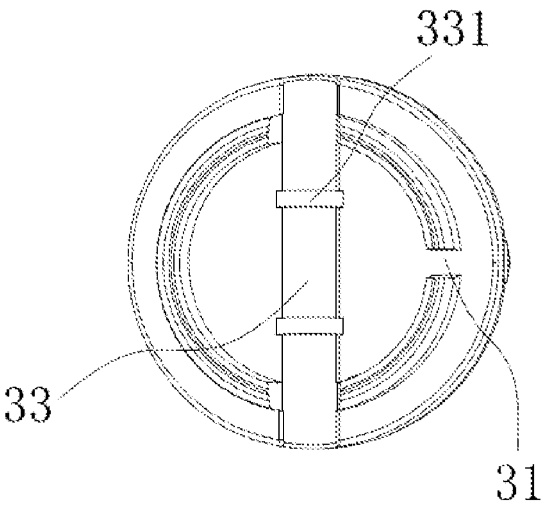
FIG. 8 is a second structural diagram of a lower end cover of a detachable pacifier of the present invention.
Figure 9:
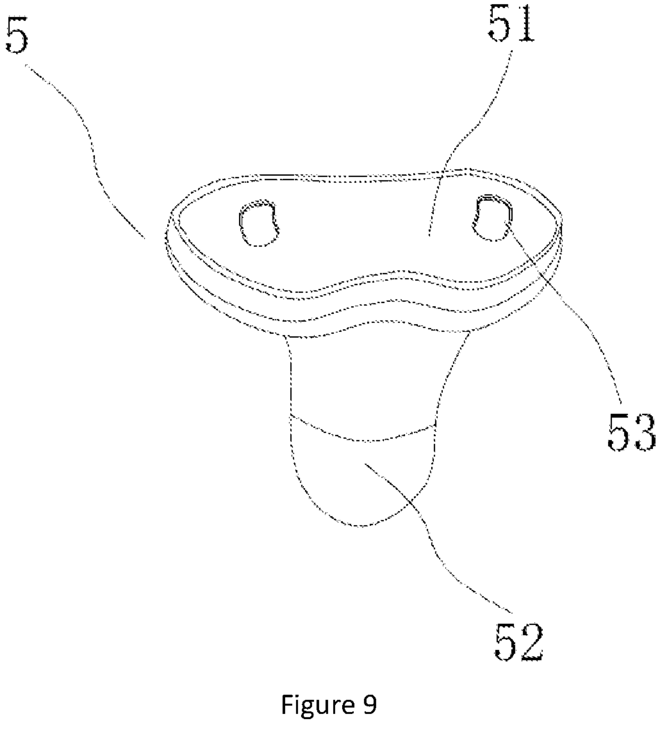
FIG. 9 is a structural diagram of a dustproof cover of a detachable pacifier of the present invention.

As shown in FIGS. 1 to 8, a detachable pacifier comprises comprising a limiting device 1 and a pressing device 2 capable of being disassembled and assembled with each other, wherein a nipple 4 is arranged below the limiting device 1, the limiting device 1 comprises a limiting plate 11 and an annular support portion 12 extending upwards along the limiting plate 11, the pressing device 2 comprises an upper end cover 21, a lower end cover 22 and a pull ring 23, which is mounted on the lower end cover 22, capable of being disassembled and matched with each other.

Specifically, the limiting plate 11 and the annular support portion 12 match each other to form a second cavity structure with an upward opening. The central position of the limiting plate 11 is provided with a nipple mounting hole 111, the nipple mounting hole 111 is in the shape of a racetrack. The purpose of arranging the nipple mounting hole 111 is to install the nipple 4 below same, such that the infants can suck easily. The lower end cover 22 is provided with a first cavity structure 222, and the central position of the first cavity structure 222 is provided with a mounting base 2221 matching the nipple mounting hole 111.

The limiting plate 11 is provided with air holes 112 at symmetrical positions on both sides, a nipple 4 is arranged below the limiting plate 11, one end of the nipple 4 is sheathed outside the mounting base 2221 in the first cavity structure 222, a dustproof cover 5 is arranged below the limiting plate 11, the dustproof cover 5 comprises a plate body 51 and a cover body 52 arranged below the plate body 51, wherein an interface 53 matching the air holes 112, is arranged above the plate body 51. The dustproof cover 5 can also use a snap-fit design. The outside of the plate body 51 is snap the outside of the limiting plate 11 by means of matching the interface 53 of the plate body 51 with the air holes 112, and the cover body 52 is assembled on the outside of the nipple 4, which can effectively prevent dust from polluting the nipple 4.

The limiting plate 11 can be designed into various structures, and different patterns can be drawn on the plate surface, so as to increase the aesthetics of the pacifier.

An external side of the annular support portion 12 is provided with three annular clamping portions 121 at intervals, and annular buckles 221 matching the annular clamping portions 121 are arranged at an inner side of the first cavity structure 222 of the lower end cover 22 at intervals, wherein the annular buckles 221 are buckled under the annular clamping portions 121 by means of pressing and rotating. The purpose of the arranging the annular buckles 221 and the annular clamping portions 121 is to facilitate assembly and disassembly.

An upper end of the annular support portion 12 is provided with a notch 122, and the annular support portion 12 is provided with a clamping block 1221 at the bottom of the notch 122; the inner side of the first cavity structure 222 is provided with a limiting block 223, a cross section of a lower end of the limiting block 223 is arc-shaped, and the limiting block 223 extends to one side of the clamping block 1221 in the notch 122 by means of pressing the lower end cover 22; the limiting block 223 is buckled on the other side of the clamping block 1221 by means of the rotation of the lower end cover 22; the clamping block 1221 is used for applying a resistance facing an opposite direction to the limiting block 223 when the lower end cover 22 rotates; and the disassembly of the lower end cover 22, the clamping block 1221 brings resistance in the opposite direction to the lower end cover 22, and the lower end cover 22 needs to be unscrewed by using great strength, such that the pacifier can be prevented from being disassembled by infants.

An upper end of the lower end cover 22 is provided with a groove 33 in a penetrating manner in a transverse direction, an upper portion of the lower end cover 22 is integrally provided with an annular connecting wall 3, wherein the annular connecting wall 3 is provided with an opening in communication with the groove 33; the upper end cover 21 is sheathed outside the annular connecting wall 3, a clamping portion 211 is arranged in the upper end cover 21, and the annular connecting wall 3 is provided with a clamping hole 31 matching the clamping portion 211; and a lower end of the upper end cover 21 is provided with a connecting hole 212, wherein the connecting hole 212 matches the groove 33. On the one hand, the annular connecting wall 3 and the clamping hole 31 are arranged such that the components can be effectively connected and assembled together; on the other hand, the components can be mounted only by means of their own structural characteristics, thus reducing the complexity of assembly; and the pull ring 23 is D-shaped and the pull ring 23 comprises a lifting portion 231 and a connecting portion 232, wherein the connecting portion 232 is arranged between the groove 33 and the connecting hole 212, and the lifting portion 231 is exposed outside; the connecting portion 232 is provided with a limiting ring 2321, and the groove 33 is provided with a recess 331 matching the limiting ring 2321, and a cross section of the connecting portion 232 is circular; the groove 33 and the connecting hole 212 are in clearance fit with the connecting portion 232; the pull ring 23 is rotatably connected to the lower end cover 22 and the upper end cover 21, wherein the limiting ring 2321 is used to fix the position of the pull ring 23 and prevent the pull ring from sliding left and right in the groove 33. The purpose of arranging the pull ring 23 is not only to facilitate holding, but also to prevent the user from directly contacting the nipple, so as to avoid cross infection and improve the hygiene quality.

The lifting portion 231 of the pull ring 23 can be provided with decorative items with different structures, which can distract the attention of infants and effectively prevent infants from crying.

When a pacifier needs to be used, one end of the nipple 4 is first connected by means of the nipple mounting hole 111, then the annular buckles 221 of the lower end cover 22 is aligned with the gap between the annular clamping portions 121 of the limiting device 1, such that the limiting block 223 is located above one side of the clamping block 1221 in the notch 122, and then the lower end cover 22 is pressed and rotated to make the annular buckles 221 and the annular clamping portions 121 match together, and the limiting block 223 is buckled on the other side of the clamping block 1221; at this time, the nipple 4 is inserted into the mounting seat 2221; then, the pull ring 23 is placed in the groove 33, and the limiting ring 2321 clamps in the recess 331 in the groove 33, and finally, the clamping portion 211 of the upper end cover 21 is aligned with the locking hole 31 of the annular connecting wall 3, and the connecting hole 212 of the upper end cover 21 is aligned with the groove 33 of the lower end cover 22. Then, the upper end cover 21 is pressed to make the upper end cover 21 and the lower end cover 22 match closely. After the whole assembly is completed, the interface 53 of the dustproof cover 5 is clamped into the air holes 112. The assembly of the pacifier can be completed by snapping the outside of the plate body 51 to the outside of the limiting plate 11.

When the pacifier needs to be cleaned, it can be disassembled into a plurality of structures and cleaned one by one. When the pacifier is disassembled, the dustproof cover 5 is removed from the limiting plate 11, then a joint between the upper end cover 21 and the lower end cover 22 is pried, so as to separate the upper end cover 21 from the lower end cover 22, the upper end cover 21 is removed from the lower end cover 22 by means of buckles, then the pull ring 23 is taken out, and then the lower end cover 22 is rotated by using great strength to unlock the lower end cover 22 from the limiting device 1. Remove the lower end cover 22 from the limiting device 1, and finally the nipple 4 can be disassembled from the mounting base 2221 in the lower end cover 22, so as to complete the disassembly of the pacifier. This process is simple and easy to operate, and all structures of the pacifier can be cleaned after disassembly.

The detachable pacifier provided by the present invention: by means of arranging buckles and the clamping portions at a structural matching portion, the assembly of corresponding structures can be completed by aligning and sequentially placing and then pressing and rotating the buckles; when cleaning the pacifier, rotate a lower end cover relative to an annular support portion, such that the annular buckles are separated from the clamping portions, and the whole structure can be disassembled into a single component; then use a nipple brush to clean from the inside to the outside of the nipple; such a structure can be disassembled, mounted and cleaned at any time, which is convenient and quick; by arranging clamping blocks at the notch of the annular support portion and arranging a limiting block matching the clamping block in the lower end cover, so that the disassembly of the lower end cover, the clamping block brings resistance in the opposite direction to the lower end cover, and the lower end cover needs to be unscrewed by using great strength, such that the pacifier can be prevented from being disassembled by infants, and the structure is stable.

Finally, it should be noted that the above embodiments only illustrate the technical solutions of the present invention, rather than limit same. Although the present invention has been described in detail with reference to the foregoing embodiments, it should be understood for a person of ordinary skill in the art that it is still possible to modify the technical solutions described in the foregoing embodiments, or to equivalently replace some technical features thereof; these modifications or substitutions do not make the essence of the corresponding technical solutions deviate from the spirit and scope of the technical solutions of various embodiments of the present invention.

The invention claimed is:

1. A detachable pacifier, characterized by comprising a limiting device (1) and a pressing device (2) capable of being disassembled and assembled with each other, wherein a nipple (4) is arranged below the limiting device (1), the limiting device (1) comprises a limiting plate (11) and an annular support portion (12) extending upwards along the limiting plate (11), an external side of the annular support portion (12) is provided with annular clamping portions (121) at intervals and in a circumferential direction, an upper end of the annular support portion (12) is provided with a notch (122), and the annular support portion (12) is provided with a clamping block (1221) at the bottom of the notch (122);

the pressing device (2) comprises a lower end cover (22), an upper end cover (21) and a pull ring (23) capable of being disassembled and assembled with each other, wherein a first cavity structure (222) is arranged below the lower end cover (22), and annular buckles (221) matching the annular clamping portions (121) are arranged at an inner side of the first cavity structure (222) at intervals; the annular buckles (221) are buckled under the annular clamping portions (121) by means of pressing and rotating; the inner side of the first cavity structure (222) is provided with a limiting block (223), and the limiting block (223) extends to one side of the clamping block (1221) in the notch (122) by means of pressing the lower end cover (22); the limiting block (223) is buckled on the other side of the clamping block (1221) by means of the rotation of the lower end cover (22); the clamping block (1221) is used for applying a resistance facing an opposite direction to the limiting block (223) when the lower end cover (22) rotates;

an upper end of the lower end cover (22) is provided with a groove (33) in a penetrating manner in a transverse direction, an upper portion of the lower end cover (22) is integrally provided with an annular connecting wall (3), wherein the annular connecting wall (3) is provided with an opening in communication with the groove (33); the upper end cover (21) is sheathed outside the annular connecting wall (3), a clamping portion (211) is arranged in the upper end cover (21), and the annular connecting wall (3) is provided with a clamping hole (31) matching the clamping portion (211); a lower end of the upper end cover (21) is provided with a connecting hole (212), wherein the connecting hole (212) matches the groove (33); the pull ring (23) comprises a lifting portion (231) and a connecting portion (232), wherein the connecting portion (232) is arranged between the groove (33) and the connecting hole (212).

2. The detachable pacifier according to claim 1, characterized in that there are three annular clamping portions (121) and the three annular clamping portions are distributed in a middle-upper portion of the annular support portion (12).

3. The detachable pacifier according to claim 1, characterized in that the connecting portion (232) is provided with a limiting ring (2321), and the groove (33) is provided with a recess (331) matching the limiting ring (2321).

4. The detachable pacifier according to claim 1, characterized in that a cross section of the connecting portion (232) is circular; the groove (33) and the connecting hole (212) are in clearance fit with the connecting portion (232).

5. The detachable pacifier according to claim 1, characterized in that the pull ring (23) is D-shaped.

6. The detachable pacifier according to claim 1, characterized in that the pull ring (23) is rotatably connected to the lower end cover (22) and the upper end cover (21).

7. The detachable pacifier according to claim 1, characterized in that a central portion of the limiting plate (11) is provided with a nipple mounting hole (111), and a central portion of the first cavity structure (222) is provided with a mounting base (2221) matching the nipple mounting hole (111).

8. The detachable pacifier according to claim 1, characterized in that the limiting plate (11) is provided with air holes (112) on both sides of the annular support portion (12).

9. The detachable pacifier according to claim 8, characterized in that a dustproof cover (5) is connected below the limiting plate (11), and the dustproof cover (5) comprises a plate body (51) and a cover body (52) arranged below the plate body (51), wherein an interface (53) matching the air holes (112), is arranged above the plate body (51).

10. The detachable pacifier according to claim 1, characterized in that a cross section of a lower end of the limiting block (223) is arc-shaped.

* * * * *